United States Patent
Cullen

(10) Patent No.: US 10,125,975 B2
(45) Date of Patent: Nov. 13, 2018

(54) METHOD OF PREDICTING WEAR ON TUBES OF STEAM GENERATOR

(71) Applicant: WESTINGHOUSE ELECTRIC COMPANY LLC, Cranberry Township, PA (US)

(72) Inventor: William K. Cullen, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 15/807,801

(22) Filed: Nov. 9, 2017

(65) Prior Publication Data

US 2018/0142884 A1     May 24, 2018

Related U.S. Application Data

(63) Continuation of application No. 15/215,002, filed on Jul. 20, 2016, now Pat. No. 9,845,950.

(60) Provisional application No. 62/194,366, filed on Jul. 20, 2015.

(51) Int. Cl.
| | |
|---|---|
| *F22B 37/38* | (2006.01) |
| *G01B 7/06* | (2006.01) |
| *F22B 37/42* | (2006.01) |
| *F28F 11/02* | (2006.01) |
| *G06N 5/04* | (2006.01) |
| *G01B 7/26* | (2006.01) |

(52) U.S. Cl.
CPC .............. *F22B 37/38* (2013.01); *F22B 37/42* (2013.01); *F28F 11/02* (2013.01); *G01B 7/10* (2013.01); *G01B 7/26* (2013.01); *G06N 5/04* (2013.01); *F28F 2200/00* (2013.01)

(58) Field of Classification Search
CPC ...... G01M 5/0033; G01N 23/18; F22B 37/38; F28F 2200/00; G06N 5/04
See application file for complete search history.

(56) References Cited

U.S. PATENT DOCUMENTS

| | | |
|---|---|---|
| 5,749,218 A | 5/1998 | Cromer |
| 8,280,145 B2 | 10/2012 | Kovarik |
| 8,750,594 B2 | 6/2014 | Kovarik |

(Continued)

FOREIGN PATENT DOCUMENTS

| | | | |
|---|---|---|---|
| CN | 107291944 A | * | 10/2017 |
| KR | 20050001859 A | * | 1/2005 |

*Primary Examiner* — Gregory A Wilson
(74) *Attorney, Agent, or Firm* — Richard J. Coldren; Westinghouse Electric Company LLC

(57) ABSTRACT

A method predicts an amount of wear that is expected to occur on the tubes of a steam generator as a result of vibration against another structure within the steam generator. The method includes determining a volumetric amount of material that has been worn from a location on a tube over a duration of time and employing that volume as a function of time to determine the volume of material of the tube wall that is predicted to be worn from the tube or another tube at a future time. The volumetric-based analysis enables more accurately prediction of the wear depth at a future time. This enables the plugging of only those tubes that are determined from a volumetric analysis to be in risk of breach at the future time, thus slowing the rate at which tubes of a steam generator will be plugged.

10 Claims, 4 Drawing Sheets

(56) References Cited

U.S. PATENT DOCUMENTS 10,060,688 B2 * 8/2018 Carlier .................... F28G 15/00
2016/0327438 A1 11/2016 Fukui

* cited by examiner

METHOD OF PREDICTING WEAR ON TUBES OF STEAM GENERATOR

CROSS REFERENCE TO RELATED APPLICATION

The instant application claims priority from U.S. Provisional Patent Application Ser. No. 62/194,366 filed Jul. 20, 2015 and U.S. patent application Ser. No 15/215,002 filed Jul. 20, 2016, the disclosures of which are incorporated herein by reference.

BACKGROUND OF THE INVENTION

Field

The disclosed and claimed concept relates generally to nuclear power generation equipment and, more particularly, to a method of predicting an amount of wear that is expected to occur on the tubes of a steam generator.

Related Art

As is understood in the relevant art, pressurized water nuclear reactors employ a primary loop that includes radioactive water that flows through the reactor core and a secondary loop that receives heat from the primary loop which is used to perform mechanical work. Such heat is communicated from the primary loop to the secondary loop by employing a steam generator having a large number of tubes that are connected in fluid communication with the primary loop. The steam generator also includes a plenum within which the fluid of the secondary loop flows into contact with the exterior surfaces of the tubes of the steam generator. The steam generator typically additionally includes anti-vibration bars and other structures that resist or at least limit the vibration of the tubes within the interior of the steam generator.

While such steam generators have been generally effective for their intended purposes, they have not been without limitation. Despite the existence of the anti-vibration bars within the interior of the steam generator, the tubes of the steam generator nevertheless experience a certain level of vibration and typically vibrate against the anti-vibration bars and other structures, thus resulting in fretting wear at certain locations on the exterior surfaces of the tubes. Such wear must be monitored closely in order to avoid a situation wherein the wear would be of sufficient magnitude that the wall of a tube would be breached, which would result in undesirable nuclear contamination between the primary and secondary loops. Additionally, regulations imposed by the United States Nuclear Regulatory commission (NRC), require the tube(s) to be physically plugged when the magnitude of the wear exceeds a value of 40% of the tube wall thickness. However, for this example that level at which plugging is required is taken as 100% of the tube wall thickness for illustration purposes only. As such, the tubes of the steam generator are periodically inspected through the use of an eddy current sensor that is received in the tubes and that is advanced along the tubes in a known fashion while signals from the sensor are detected and recorded. The signals from the eddy current sensor are usable to determine, for instance, a depth of wear on the exterior of a tube at a location thereon.

By knowing the thickness of the tube wall, the wear analysis that has heretofore been employed would rely upon a straight line depth of wear analysis to predict wear on the tube. For instance, if at a given previous time it had been determined that 20% of the wall thickness had been worn away at a specific location, and that at a current time 60% of the wall thickness had been worn away at the specific location, the analysis would conclude that during the time interval between the two times at which measurements were taken, an additional 40% of the tube wall thickness had been worn away. Employing the same straight line depth of wear analysis, this methodology would predict that at a future time after another time interval equal to the previous time interval, another 40% of the wall thickness would be expected to worn away. In the present example, such wear would include the 60% wall thickness worn away at the current time plus an additional predicted 40% wall thickness worn away at the future time, which would equal 100% of the wall thickness being worn away at the future time, and this indicates an undesirable breach of the tube wall.

Since such inspections typically occur during refueling of a nuclear reactor and thus are at regular time intervals, it was possible, using the aforementioned analysis, to determine whether certain tubes should be plugged prior to the steam generator and the reactor being placed back into service. It is known, however, that the plugging of a tube of a steam generator is undesirable because it reduces the power output that can be obtained from a nuclear reactor. Improvements thus would be desirable.

SUMMARY

An improved method is usable to predict an amount of wear that is expected to occur on the tubes of a steam generator as a result of vibration against another structure within the steam generator. The method includes determining a volumetric amount of material that has been worn from a specific location on a tube over a duration of time and employing that volume of material as a function of time to determine the volume of material of the tube wall that is predicted to have been removed from the tube due to wear at a future time. By employing a volumetric-based analysis rather than merely a straight line depth of wall thickness analysis, it is possible to more accurately predict what will be the wear depth at a future time. This advantageously enables the plugging of only those tubes that are determined from a volumetric analysis to be in risk of breach at the future time, or exceeding the plugging requirement at the future time, thus slowing the rate at which tubes of a steam generator will be plugged.

Accordingly, as aspect of the disclosed and claimed concept is to predict an amount of wear that is expected to occur on a tube of a steam generator.

Another aspect of the disclosed and claimed concept is to employ such a method in determining whether a tube of a steam generator whose potential wear has not been assessed can be assumed to remain viable until its next scheduled inspection time.

Another aspect of the disclosed and claimed concept is to provide such an improved method that employs the volume of the material removed from the wall of the tube rather than merely relying upon the depth of the material removed to perform a linear analysis of wear to avoid premature plugging of the tube.

Accordingly, an aspect of the disclosed and claimed concept is to provide an improved method of predicting an amount of wear that is expected to occur on one or more tubes from among a plurality of tubes of a steam generator as a result of vibration against another structure of the steam generator. The method can be generally stated as including determining a durational volumetric amount of material that has been worn from a given location on at least one tube from among the plurality of tubes over a duration of time, determining a current wear state of a particular tube from among the plurality of tubes, the current wear state including a current volumetric amount of material that has been worn from a particular location on the particular tube compared with a new condition, determining a predicted wear state at the particular location, the predicted wear state including a future volumetric amount of material that is predicted to be worn from the particular location at a future time, the future volumetric amount being based at least in part upon the current volumetric amount and the durational volumetric amount, determining based at least in part upon the predicted wear state a predicted wear depth that is predicted to exist at the particular location at the future time, and plugging the particular tube responsive to the predicted wear depth meeting a predetermined threshold.

BRIEF DESCRIPTION OF THE DRAWINGS

A further understanding of the disclosed and claimed concept can be gained from the following Description when read in conjunction with the accompanying drawings in which.

Similar numerals refer to similar parts throughout the Specification.

DESCRIPTION

Figure 1A:
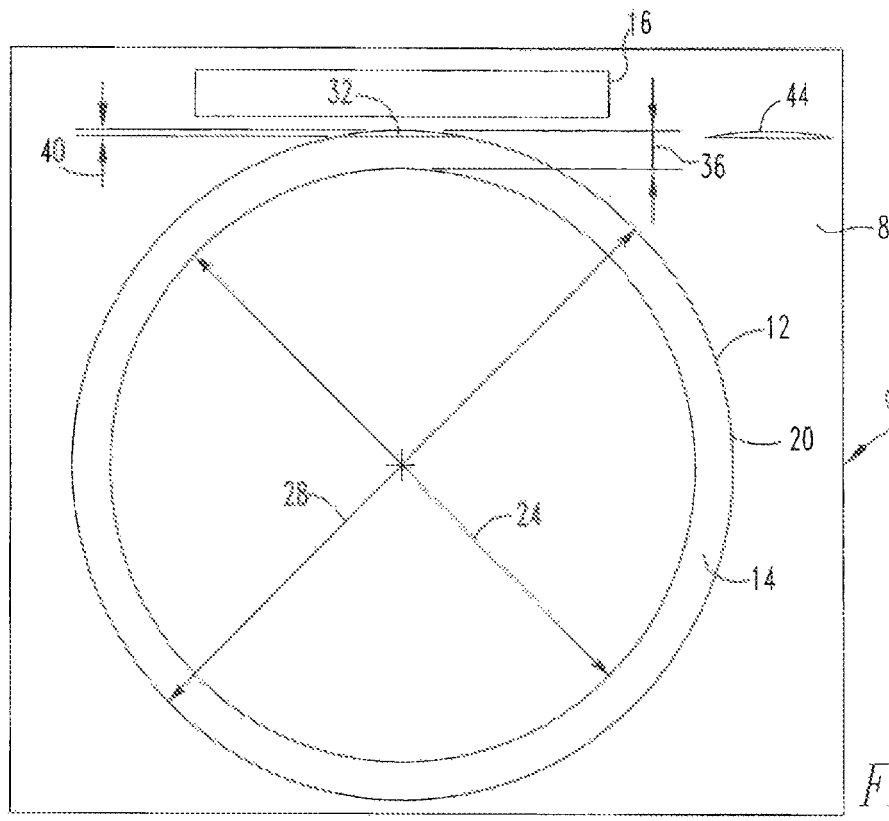
FIG. 1A is a schematic depiction of a steam generator and a tube therein at a first time T1.

A steam generator 4 is schematically depicted in FIG. 1A. The steam generator 4 is in fluid communication with the primary and secondary loops of a nuclear power plant and includes a plurality of tubes 8 that include a tube 12 that is depicted in FIG. 1A. The steam generator 4 additionally includes a number of other structures internal thereto that include a number of anti-vibration structures that include an anti-vibration bar 16 that is depicted in FIG. 1A in proximity to the tube 12. As employed herein, the expression "a number of" and variations thereof shall refer broadly to any non-zero quantity, including a quantity of one.

The exemplary tube 12 includes a wall 14 having an exterior surface 20 at which wear occurs due to its vibrational engagement with the anti-vibration bar 16. Specifically, FIG. 1A depicts the exemplary wear as having occurred at a wear location 32 that is situated at a specific location along the length of the tube and at a certain circumferential location about the circumference of the tube 12. In this regard, it is understood that the anti-vibration bar 16 that is depicted in FIG. 1A is of only a limited depth into the plane of the page of FIG. 1A, and thus the wear that is depicted on the tube 12 in FIG. 1A is occurring only along a limited portion of the length of the tube 12. The tube 12 additionally has an original inner diameter 24 and an original outer diameter 28 that are in existence at the time of manufacture of the tube 12 and prior to the steam generator 4 being placed into service. An original wall thickness 36 thus can be derived from the original inner and outer diameters 24 and 28 and is depicted in FIG. 1A as extending between an inner surface of the tube 12 and a portion of the exterior surface 20 that has not been worn away due to contact with the anti-vibration bar 16.

As noted above, FIG. 1A reflects a certain amount of wear on the tube 12 at a time T1, it being understood that the time T1 is a certain period of time after the steam generator 4 was placed into service, and that tube 12 thus has a certain amount of wear at the wear location 32 at the time T1. More specifically, the tube 12 is depicted in FIG. 1A as having a wear level at time T1 as indicated at the numeral 40 and that is the portion of the original wall 14 that has been removed due to vibration engagement between the tube 12 and the anti-vibration bar 16 at the wear location 32. It is assumed in FIGS. 1A and 1B that the engagement between the tube 12 and the anti-vibration bar 16 results in a wear pattern that is of a planar shape, but this is not intended to be limiting and rather is merely provided as an example. Wear patterns of other shapes can be evaluated according to the teachings presented herein without departing from the spirit of the present concept.

FIG. 1A also indicates at the numeral 44 a representation of the material that has been worn away from the tube 12 at the wear location 32 as of the time T1. It is understood that the material 44 is intended merely to represent the volume of material that has been worn away from the tube 12 at the time T1 and is not intended to suggest that the material that has been removed from the tube at the time T1 was worn away as an individual piece of material. Rather, the wear would have occurred over the course of time prior to the time T1 and would have been removed in extremely small amounts, perhaps approximately microscopic amounts, with successive engagements of the tube 12 with the anti-vibration bar 16 as the tube 12 had vibrated within the steam generator 4.

The improved method described herein advantageously recognizes that the tube 12 engages the anti-vibration bar 16 with a fixed level of energy that is substantially unvarying. That is, as the tube 12 vibrates, it strikes or rubs against or otherwise engages the anti-vibration bar 16 with the same amount of energy at all times. Since the amount of energy with which the tube 12 engages the anti-vibration bar 16 directly relates to the volumetric amount of material that is removed from the tube 12 with each such engagement, the engagement between the tube 12 and the anti-vibration bar 16 removes from the tube 12 the material thereof at a fixed volumetric rate as a function of time.

At the time T1, therefore, as the eddy current sensor is received through the tube 12, the signals that are received from the eddy current sensor enable a technician or other individual to determine the wear level 40, which is the depth of wear into the tube 12 at time T1. This depth of wear 40 can be used in conjunction with other data, such as the graph of FIG. 2, to determine the amount of volume of the material 44 of the tube 12 that has been removed from the tube 12 at the time T1. For instance, it might be determined that the depth of wear of time at T1 is 0.009 inches of material removed from the tube 12. This would correspond, from FIG. 2, with a volume of removed material of approximately 0.00046 inches$^3$. As can be seen in FIG. 3, an amount of removed volume equal to 0.00046 inches$^3$ corresponds with a wear depth of 20% of the wall thickness, meaning that 20% of the wall thickness has been worn away.

Figure 2:
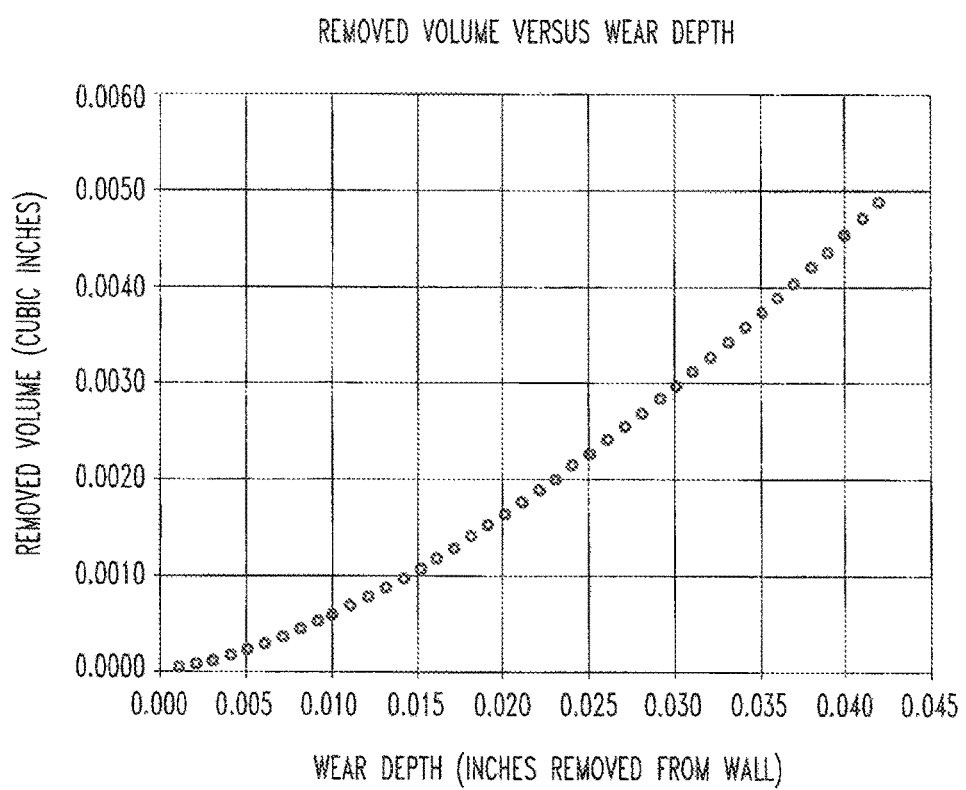
FIG. 2 is a graph depicting removed volume versus wear depth.
Figure 3:
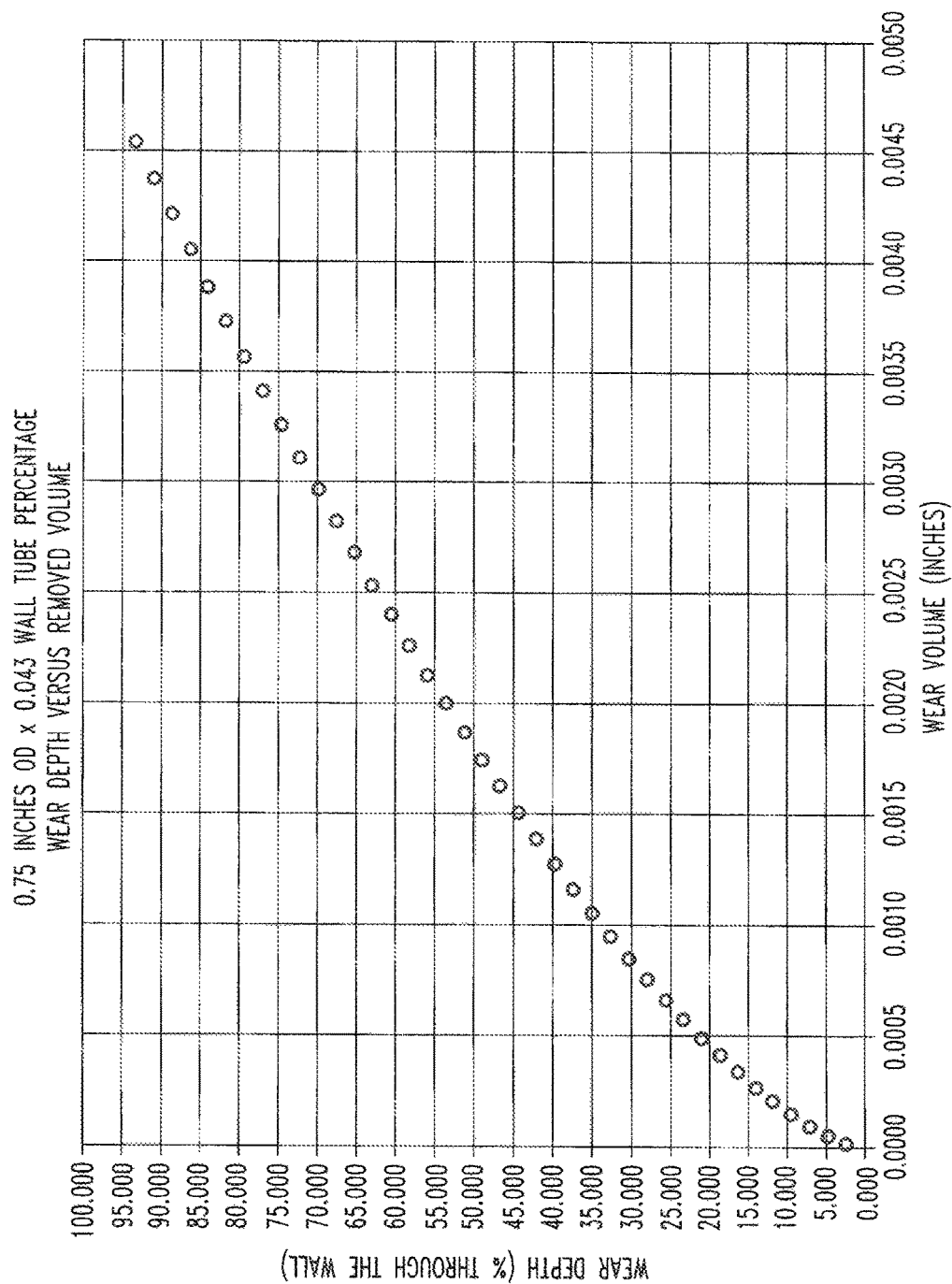
FIG. 3 is a graph depicting tube wall percentage wear depth versus removed volume.

It is noted that the graphs in FIGS. 2 and 3 are for an exemplary 0.75 inch OD tube having a wall thickness of 0.043 inches when new. The data in the graphs in FIGS. 2 and 3 can be obtained in any of a variety of ways, such as mathematically or with the use of software programs, by way of example, and are very easy to derive.

Figure 1B:
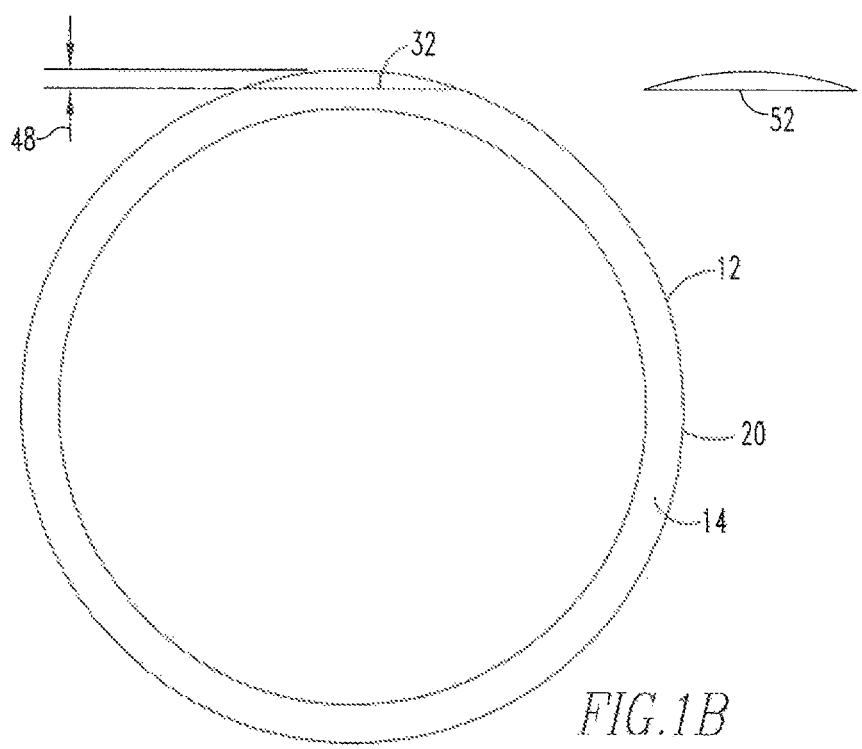
FIG. 1B is a view of a tube of the steam generator of FIG. 1A at a second time T2 subsequent to the first time.

FIG. 1B depicts the tube 12 at a time 12 that is subsequent to the time T1. FIG. 1B depicts at the numeral 48 a depth of wear of the tube 12 at the time 12 and further depicts at the numeral 52 a representation of the volumetric amount of material that has been worn away from the tube 12 as of the time T2 due to wear against the anti-vibration bar 16. Again, it is understood that the material 52 is merely a representation of the volumetric amount of the material of the wall 14 of what has been removed over time due to wear and is not intended to suggest that the material would have been removed as a single piece of material. Rather it is understood that the representation of the material that is indicated at the numeral 52 is meant to represent a number of additional engagements between the tube 12 and the anti-vibration bar 16 between the times T1 and T2 which has resulted in additional wear on the tube 12 at the wear location 32.

In the example presented in FIG. 1B, the eddy current sensor data might have determined that the wear depth at the wear location 32 at the time T2 is equal to 0.026 inches of material removed from the wall 14. If the wear depth is determined to be equal to 0.026 inches, FIG. 2 would indicate that the corresponding removed volume of material from the tube 12 at time T2 equals 0.00236 inches$^3$. FIG. 3 would suggest that 0.00236 inches$^3$ of removed volume of the tube 12 corresponds with 60% total wear depth. In this regard, it is understood that 0% wear depth would refer to a new condition for the tube 12, and that 100% wear depth indicates a breach in the wall of the tube 12. Between the time T1 and the time T2, it can be seen that the exemplary wear went from 20% wear depth at time T1 to 60% wear depth at time T2 for an increase in the wear depth of 40% between time T1 and time T2.

It may be desirable to predict, for example, the wear state that is expected to exist at the wear location 32 on the tube 12 at a future time T3 that is subsequent to time T2. For the purposes of providing an example, it will be assumed that the duration of time between T2 and T3 is equal to the duration of time between time T1 and time T2. In this regard, it is noted that nuclear reactors are refueled on a regular basis, typically with an equal time between each refueling operation. If one were to rely open the previously known analysis methodology and consider only the depth of the wear at the wear location 32, one might employ a straight line analysis based upon the wear depth at T1 and the wear depth at T2 to guess at a wear depth at T3 by adding to the wear depth at T2 (which is 60% wear depth) an additional wear depth that would be expected to occur between time T2 and time T3. Since the interval between time T1 and time T2 is equal to the time interval between time T2 and time T3, the straight line wear depth analysis would add to the 60% wear at time T2 an additional 40% wear depth at time T3 to equal 100% wear depth at T3. If this analysis were followed, it would indicate that the tube 12 should be plugged prior to time T3, if the wear depth which requires plugging were equal to 100%. If, for instance, time T3 were the next planned outage for the steam generator 4 after the time T2, this would indicate that the tube 12 is in need of being plugged at the time T2 and prior to the steam generator 4 being placed back in service. This would be undesirable because the improved volumetric analysis that is set forth below would instead suggest that the tube 12 need not be plugged at the time T2. It is reiterated that the aforementioned regulation by the NRC requires that a tube should be plugged prior to reaching 40% wear, and it is thus expressly noted that the amounts of wear mentioned herein are merely for purposes of illustration of the advantageous concepts disclosed and claimed herein and are not intended to be limiting and are not intended to illustrate compliance with NRC requirement.

That is, from a volumetric standpoint, it can be determined from the wear volume of 0.00046 cubic inches at time T1 and the wear volume of 0.00236 cubic inches at time T2 that during the interval between time T1 and time T2, 0.00190 cubic inches of material was removed from the tube 12 at the wear location 32. This can be referred to as a durational volumetric amount of material that has been worn away from the tube 12 at the wear location 32 over the duration of time between the times T1 and T2. If, as is assumed herein, the time duration between times T1 and 12 is equal to the time duration between times T2 and T3, the predicted wear state at time T3 can be determined by adding to the current wear state of the tube 12 at time T2 the durational volumetric amount of material. That is, in the depicted example, the current wear state is the wear state of the tube 12 at time T2 which, as set forth above, is with 0.00236 cubic inches of material having been removed from the tube 12 at time T2. By adding to this the durational volumetric amount of 0.00190 cubic inches, a future volumetric amount of material can be calculated to be 0.00426 cubic inches of material that is predicted to have been worn away from the tube 12 at the time T3. From FIG. 3, it can be seen that a removed volume of 0.00426 cubic inches corresponds with a wear depth percent of only 90%, which is below the 100% that would have been obtained by employing merely a straight line depth wear analysis. That is, by employing a volumetric analysis, it will be unnecessary in the indicated example to plug the tube 12 in advance of the time T3, and rather the tube 12 can be plugged in advance of a later time subsequent to the time T3.

It is reiterated that in the example that is presented herein the time duration between time T1 and time 12 is equal to the time duration between time T2 and time T3. If the duration between time T2 and time T3 were instead greater or less than the time duration between time T1 and time T2, a correspondingly proportionally decreased or increased proportion of the durational volumetric amount can be added to the current wear state. For instance, if the duration between time T2 and time T3 was equal to 1.1 times the duration of time between time T1 and time T2, the predicted wear state could be obtained by adding 1.1 times the durational volumetric amount, which would be 0.00209 cubic inches to the current wear state of 0.00236 cubic inches of material removed from the tube 12 to result in a total predicted wear of 0.00445 cubic inches of material removed and a wear depth from FIG. 3 of 92%. These exemplary calculations are provided for purposes of illustration and obviously do not employ the significant figure analysis that typically would be used when combining such values.

It thus can be seen that the volumetric analysis that is presented herein would enable the tube 12 to remain unplugged prior to time T3 whereas the straight line depth of wear analysis would incorrectly suggest that the tube 12 would have needed to be plugged. The improved volumetric analysis set forth herein desirably avoids premature plugging any of the tubes of the steam generator 4.

Figure 4:
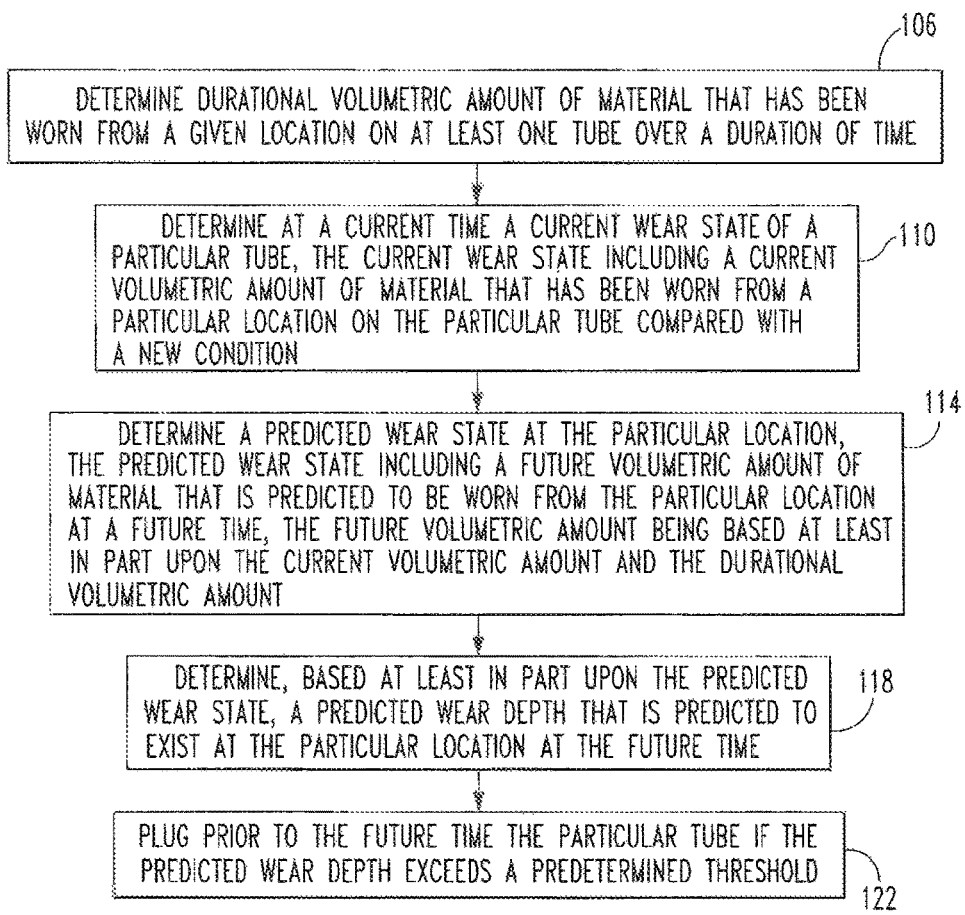
FIG. 4 is a flowchart depicting certain aspects of an improved method in accordance with the disclosed and claimed concept.

An improved flowchart that depicts certain aspects of the improved method is depicted generally in FIG. 4. Processing can begin, as at 106, where a durational volumetric amount of material that has been worn from a given location on at least one tube over a duration of time can be determined. In the example presented above, the durational volumetric amount was determined by subtracting the current wear state of 0.00236 cubic inches of material having been removed from the tube 12 at time T2 from the previous volumetric amount of material that had been removed from the tube 12 at time T1 which was 0.00046 cubic inches, thus resulting in a durational volumetric amount of 0.00190 cubic inches of removed material for the time duration between times T1 and T2.

Processing then continues, as at 110, where at a current time a current wear state is determined for a particular tube such as the tube 12, with the current wear state including a current volumetric amount of material that has been removed by wear from a particular location on the particular tube compared with a new condition. This was calculated in the example presented above by employing the eddy current sensor to determine that at the time T2 the current amount of material that had been removed from the tube 12 since its new state was 0.00236 cubic inches.

Processing then continues, as at 114, where a predicted wear state at the particular location is determined, with the predicted wear state including a future volumetric amount of material that is predicted to be worn from the particular location at a future time, and with the future volumetric amount being based at least in part upon the current volumetric amount and the durational volumetric amount. In the example presented above, this was done by adding to the current volumetric amount of 0.00236 cubic inches of removed material the durational volumetric amount of 0.00190 cubic inches of removed material to result in a predicted wear state at the future time of 0.00236+0.00190=0.00426 cubic inches of material that is predicted to be removed from the tube 12 at the time T3.

Processing then continues, as at 118, where a predicted remaining wear depth is determined based at least in part upon the predicted wear state, with the predicted wear depth being predicted to exist at the particular location at the future time. This was done in the example presented above by consulting FIG. 3 and determining that 0.00426 cubic inches of removed volume from the tube 12 corresponded with a wear depth of 90%. Processing would continue, as at 122, where at a time prior to the future time the particular tube 12 would be plugged if the exceeds a predetermined threshold which, in the described example, is a wearing away of 100% of the thickness of the wall of the tube 12. Since the predicted wear state was a wear depth of only 90% of the tube 12 wall at time T3, plugging of the tube 12 was not indicated. It is noted that instead of plugging the tube only if the prediction suggests that the predicted tube wear will breach the tube, it is possible to employ some other threshold, such as plugging the tube if the predicted wear would be, say, 80% at the future time. Other thresholds can be employed without departing from the spirit of the disclosed and claimed concept, and it is reiterated that the NCR regulation would impose a plugging threshold of 40% wear depth. Other embodiments may then permit the tube to never require plugging as while the volume of removed tube material is constant, a maximum depth of wear may be associated a given tube. If, for example, the tube were to experience maximum amplitude of vibration of 0.0258 inches, which is associated with a wear depth of 60%, the straight line depth approximation would require the tube to be plugged for a plugging requirement of 100%. As the volumetric approximation would not predict that a depth of 100% is achieved at the next duration, and the eddy current analysis at the next duration indicates a wear depth of 60%, or 0.0258 inches, the inspection result would suggest that no further wear depth progression will be experienced and the tube can remain operational, thus never requiring plugging.

It thus can be seen that the volumetric analysis presented herein avoids the need to prematurely plug tubes by plugging tubes only when it is predicted that 100% of the wall thickness or other predetermined amount of the wall thickness based on a volumetric analysis has been removed from the wall. This advantageously avoids the need to prematurely plug tubes and likewise avoid prematurely unnecessary reducing power output from a nuclear reactor.

It is expressly noted that while the exemplary tube 12 is depicted in both FIGS. 1A and 1B, it is understood that the data from one tube 12 of the steam generator 4 can be used to predict wear on a separate tube 12 of the steam generator 4. For instance, it is understood that inspections of the plurality of tubes 8 of the steam generator 4 do not necessarily occur with each shutdown and refueling of the nuclear reactor. Rather, inspections are typically only done at every third refueling, and the inspection typically is only as to approximately one-half of the tubes from among the plurality of tubes 8. It is therefore possible that a given tube in the steam generator 4 might not actually be inspected until the sixth refueling of the reactor. However, it is possible to employ the wear on one tube to predict the wear on another tube. For example, the wear on the tube 12 in FIG. 1A might be the wear that was determined by eddy current analysis to exist in a tube 12 at the third refueling of the nuclear reactor. It might also be determined that the wear as indicated in FIG. 1B is the wear that existed on the same tube or on another tube at the sixth refueling of the nuclear reactor. If the two tubes 12 in FIGS. 1A and 1B are either the same tube or are assumed to have comparable vibration characteristics and thus comparable wear rates, the difference in wear between the tube in FIG. 1A and the tube in FIG. 1B can be employed to determine the durational volumetric amount of material that has been worn over a duration of time, and this information is usable to project wear on all similar tubes of the steam generator 4. For instance, from the foregoing analysis, it was determined that the wear at time T3 would be only approximately 90% wear depth of the original wall thickness, which did not indicate a need for plugging of the tube prior to time T3, for a hypothetical plugging requirement that requires plugging only prior to a wear depth of 100%. If the time duration between the tube of FIG. 1A and the tube of FIG. 1B is an additional three refuelings of the nuclear reactor, this would suggest that any of the tubes in the steam generator 4 that have similar vibration characteristics to the tubes that are depicted in FIGS. 1A and 1B would not need to be the subject of a plugging operation prior to the ninth refueling operation because an additional three refueling operations beyond the sixth refueling operation represented in FIG. 1B will result in only at most about 90% wear depth at the wear location 32 and at the other wear locations on the other tubes 12. As such, the data gleamed from a limited number of tubes 12 of the plurality of tubes 8 enables broad-based predictions on wear and performance, which is desirable.

The improved method set forth above can be implemented on any type of computing device such as a general purpose computer that might receive eddy current data as an input that is received via an input apparatus and that can perform operations on such inputs using a processor apparatus to result in outputs that may be in the form of an instruction either to plug a given tube or to refrain from plugging a given tube. Such manipulations can be performed by routines that are stored in a storage of the processor apparatus and that are executed on a processor of the processor apparatus.

Accordingly, the improved method reduces unnecessary reductions in the power generation capability of a nuclear reactor by avoiding unnecessary plugging of tubes of a steam generator. The advantageous volumetric analysis that is employed to avoid such unnecessary plugging of tubes is a more accurate evaluation of wear mechanisms and is thus desirably employed.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the foregoing disclosure.

What is claimed is:

1. A method of predicting an amount of wear that is expected to occur on a tube of a plurality of tubes of a steam generator comprising:
   determining a volumetric amount of material that has been worn from a location on the tube over a duration of time;
   employing the volumetric amount as a function of time to determine a volume of material of the tube that is predicted to be worn from the tube at a future time; and
   plugging the tube in response to a predicted wear depth based upon the volume of material meeting a predetermined threshold.

2. The method of claim 1, further comprising:
   determining, a current wear state at a current time when the volumetric amount of material has been worn from the location, the current time being prior to the future time; and
   performing the plugging at a time subsequent to the current time but prior to the future time.

3. The method of claim 1, further comprising:
   determining, a current wear state at a current time when the volumetric amount of material has been worn from the location, the future time being a period of time subsequent to the current time; and
   calculating the volume of material by adding together the volumetric amount and a proportional portion of the volumetric amount at corresponds with the ratio of the period of time to the duration of time.

4. The method of claim 1, further comprising:
   performing on the steam generator an inspection operation on fewer than all of the tubes of the plurality of tubes wherein a given tube other than the tube is uninspected during the inspection operation;
   predicting a predicted wear condition on the given tube that includes a predicted volumetric amount of material that is predicted to be worn from a given location on the given tube at the future time, the predicted volumetric amount being based at least ire part upon the volumetric amount;
   determining based at least in part upon the predicted wear condition a calculated wear depth that is predicted to exist at the given location at the future time; and
   operating the steam generator without plugging the given tube responsive to the calculated wear depth not meeting a predetermined threshold.

5. A method of predicting an amount of wear hat is expected to occur on one or more tubes from among a plurality of tubes of a steam generator, the method comprising:
   determining a volumetric amount of material that has been worn from a location can a tube from among the plurality of tubes over a duration of time;
   determining a predicted wear state on one of the tube and another tube from among the plurality of tubes that is predicted to exist on the one of the tube and the another tube at a future time based at least in part upon the volumetric amount and the duration of time; and
   plugging the one of the tube and another tube responsive to the predicted wear state meeting a predetermined threshold.

6. The method of claim 5, further comprising:
   determining a current wear state at a current time when the volumetric amount of material has been worn from the location on the tube prior to the future time; and
   performing the plugging at a time subsequent to the current time but prior to the future time.

7. The method of claim 5, further comprising:
   determining a current wear state at a current time, the future time being a period of time subsequent to the current time; and
   determining a predicted Near state on the tube by adding together the volumetric amount and a proportional portion of the volumetric amount that corresponds with the ratio of the period of time to the duration of time.

8. The method of claim 5, further comprising:
   performing on the steam generator an inspection operation on fewer than all of the tubes of the plurality of tubes wherein a given tube other than the tube and the another tube is uninspected during the inspection operation; and
   predicting a predicted wear condition on the given tube that includes a predicted volumetric amount of material that is predicted to be worn from a given location on the given tube at the future time, the predicted volumetric amount being based at least in part upon the volumetric amount and the duration of time.

9. The method of claim 8, further comprising determining based at least part upon the predicted wear condition a calculated wear depth that is predicted to exist at the given location at the future time.

10. The method of claim 9, further comprising operating the steam generator without plugging the given tube responsive to the calculated wear depth not meeting a predetermined threshold.

* * * * *